United States Patent
Hirai et al.

(10) Patent No.: US 10,266,411 B2
(45) Date of Patent: Apr. 23, 2019

(54) METHOD OF PRODUCING CARBON NANOTUBE-CONTAINING COMPOSITION

(71) Applicant: Toray Industries, Inc., Tokyo (JP)

(72) Inventors: Takayoshi Hirai, Nagoya (JP); Kenshi Miyaura, Nagoya (JP); Hidekazu Nishino, Nagoya (JP); Shiro Honda, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/736,495

(22) PCT Filed: Jul. 13, 2016

(86) PCT No.: PCT/JP2016/070715
§ 371 (c)(1),
(2) Date: Dec. 14, 2017

(87) PCT Pub. No.: WO2017/010523
PCT Pub. Date: Jan. 19, 2017

(65) Prior Publication Data
US 2018/0170758 A1   Jun. 21, 2018

(30) Foreign Application Priority Data
Feb. 29, 2016   (JP) .................. 2016-037380

(51) Int. Cl.
*C01B 32/162* (2017.01)
*B82Y 30/00* (2011.01)
*B82Y 40/00* (2011.01)

(52) U.S. Cl.
CPC ............ *C01B 32/162* (2017.08); *B82Y 30/00* (2013.01); *B82Y 40/00* (2013.01); *C01B 2202/04* (2013.01);
(Continued)

(58) Field of Classification Search
CPC .............. C01B 31/022; C01B 31/0226; C01B 31/0233; C01B 31/024; C01B 31/0246;
(Continued)

(56) References Cited

U.S. PATENT DOCUMENTS 6,790,426 B1 * 9/2004 Ohsaki ................... B82Y 30/00
423/447.2
8,182,782 B1 * 5/2012 Moravsky .............. B82Y 10/00
423/445 R
(Continued)

FOREIGN PATENT DOCUMENTS

CN    101585525 A    11/2009
CN    101585526 A    11/2009
(Continued)

*Primary Examiner* — Daniel McCracken
(74) *Attorney, Agent, or Firm* — DLA Piper LLP (US)

(57) ABSTRACT

A method of producing a carbon nanotube-containing composition is a method of producing a carbon nanotube-containing composition for synthesizing carbon nanotube aggregates by introducing a ferrocene derivative, a sulfur compound, a carbon source, and a carrier gas into a gas phase flowing in a heating furnace within a temperature range of higher than 1,200° C. to 1,800° C. The carbon source substantially consists of benzene or toluene. The carrier gas includes hydrogen at 10% by volume to 85% by volume. The carrier gas has a linear velocity of 500 cm/min to 2,200 cm/min.

6 Claims, 1 Drawing Sheet

(52) U.S. Cl.
CPC ....... *C01P 2004/50* (2013.01); *Y10S 977/752* (2013.01); *Y10S 977/843* (2013.01)

(58) Field of Classification Search
CPC .............. C01B 31/0253; C01B 31/026; C01B 31/0266; C01B 31/0273; C01B 31/028; C01B 31/0286; C01B 31/0293; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; C01B 2202/00; B82Y 5/00; B82Y 10/00; B82Y 15/00; B82Y 20/00; B82Y 25/00; B82Y 30/00; B82Y 35/00; B82Y 40/00; B82Y 99/00; D01F 9/10; D01F 9/127; D01F 9/1271; D01F 9/1272; D01F 9/1273; D01F 9/1274; D01F 9/1275; D01F 9/12
See application file for complete search history.

(56) References Cited

U.S. PATENT DOCUMENTS

| | | |
|---|---|---|
| 2008/0107587 A1 | 5/2008 | Yumura et al. |
| 2009/0186223 A1 | 7/2009 | Saito et al. |
| 2012/0107610 A1 | 5/2012 | Moravsky et al. |

FOREIGN PATENT DOCUMENTS

| | | |
|---|---|---|
| CN | 101830455 A | 9/2010 |
| CN | 103204492 A | 7/2013 |
| JP | 2002-88591 A | 3/2002 |
| JP | 2006-45057 A | 2/2006 |
| JP | 2012-46841 A | 3/2012 |
| JP | 2013-35750 A | 2/2013 |
| JP | 2015-48263 A | 3/2015 |
| WO | 2006/064760 A1 | 6/2006 |

\* cited by examiner

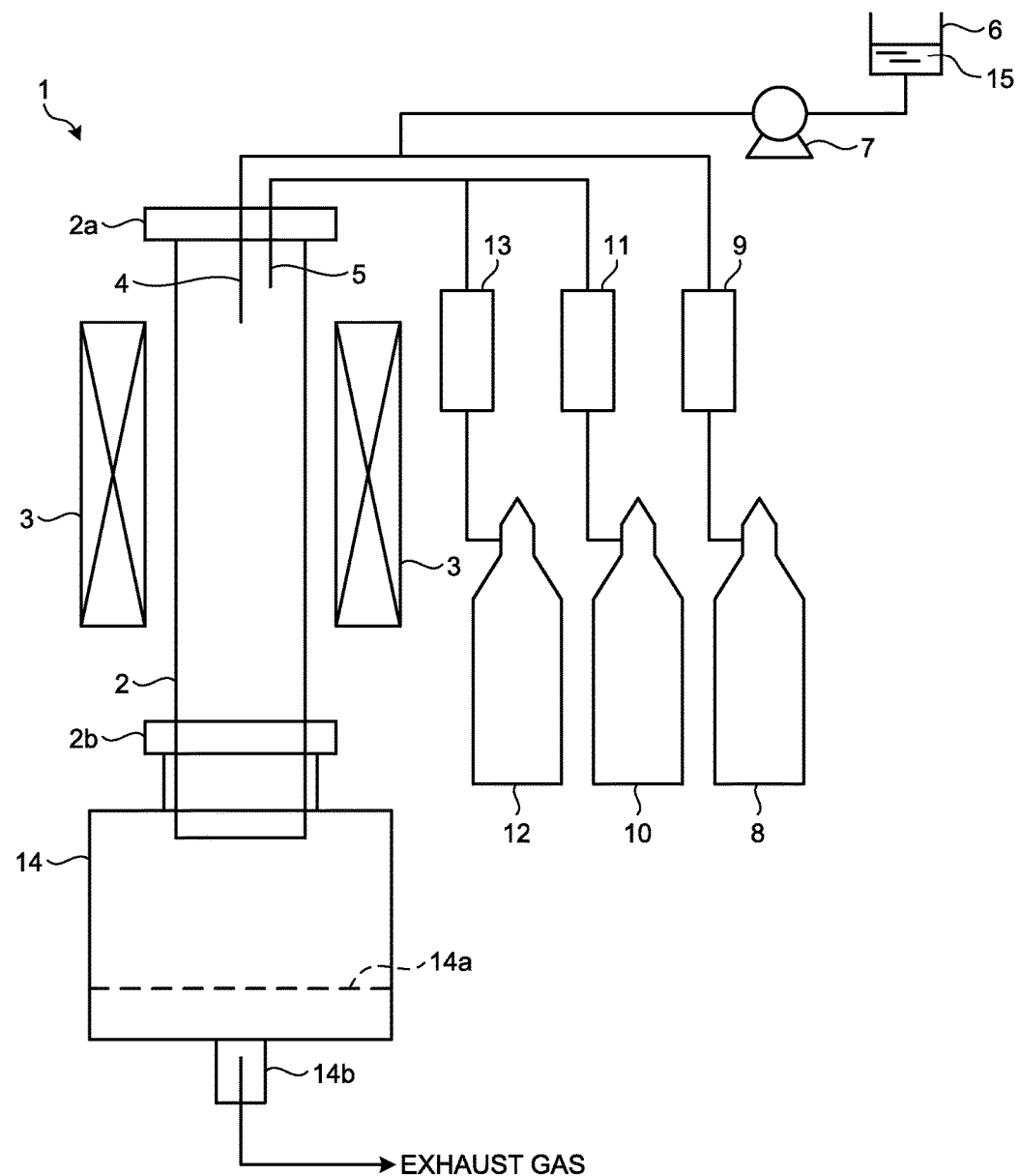

METHOD OF PRODUCING CARBON NANOTUBE-CONTAINING COMPOSITION

TECHNICAL FIELD

This disclosure relates to a method of producing a carbon nanotube-containing composition.

BACKGROUND

Except for special cases, the structure of a carbon nanotube (hereinafter may be abbreviated as "CNT") is often classified into a single-walled CNT having a structure in which only one layer of graphite is wound in a tubular shape, a double-walled CNT in which two layers of graphite form a tubular structure, and a multi-walled CNT in which a plurality of layers of graphite of three or more layers form a concentric cylindrical tubular structure. CNT has attracted attention for more than 10 years as a nanomaterial having excellent mechanical properties, excellent thermal conductivity, and excellent electrical conductivity. Highly pure CNT, however, is difficult to produce in high productivity. In many cases, a low quality CNT is synthesized in large quantities or an inefficient synthetic method that can produce a remarkably highly pure CNT, but cannot produce a sufficient amount of CNT for commercial use is used.

In recent years, it has been announced that a synthesis method called a super growth method (formerly the National Institute of Advanced Industrial Science and Technology) can produce carbon nanotube aggregates (here, a state in which countless CNTs including impurities and additives are collected is determined as the carbon nanotube aggregates) having high purity and low impurities in large quantities. The super growth method refers to a method in which the yield of CNT per process is significantly increased by adding water to oxidize carbon impurities and thus preventing occurrences of the situation where a catalyst surface is covered with the carbon impurities during the synthesis to inactivate the catalyst. The added water, however, may provide damage for not only the carbon impurities, but also CNT. In addition, when production efficiency is considered, it is also a concern that the super growth method is a synthesis method based on a substrate method.

On the other hand, a floating catalyst method has been known as a highly efficient synthesis method in which raw materials are continuously charged and CNT can be continuously recovered. A method of directly and continuously producing a fiber (thread) made of CNT by utilizing the continuity of the floating catalyst method has been developed (refer to Japanese Patent Application Laid-open No. 2012-46841). According to the method described in Japanese Patent Application Laid-open No. 2012-46841, however, twisted yarns of CNTs are ultrafine fibers and only fibers that are difficult to use for applications requiring robustness can be synthesized because the yield of CNT per unit time is remarkably low. Although the yield is remarkably low, a method in which remarkably highly pure carbon nanotube aggregates can be synthesized has also been developed (refer to Japanese Patent Application Laid-open No. 2013-35750). In addition, methods of synthesizing carbon nanotube aggregates including a double-walled CNT by devising two or more of introduced raw materials and devising a mixture ratio of catalysts and the like have also been developed (refer to Japanese Patent Application Laid-open No. 2015-48263 and Japanese Patent Application Laid-open No. 2006-45057).

The methods of producing carbon nanotube aggregates include many production methods characterized in yield, efficiency, purity, crystallinity, number of layers, and the like. Even if different methods or synthesis conditions are combined, however, synergistic effects do not always appear. Consequently, at present, a method of producing carbon nanotube aggregates having high crystallinity and high purity in high efficiency and high yield cannot be practically achieved.

It could therefore be helpful to provide a method of producing a carbon nanotube-containing composition from which carbon nanotube aggregates having high purity can be synthesized in high efficiency and high yield.

SUMMARY

We thus provide:
A method of producing a carbon nanotube-containing composition for synthesizing carbon nanotube aggregates including: introducing a ferrocene derivative, a sulfur compound, a carbon source, and a carrier gas into a gas phase flowing in a heating furnace within a temperature range of higher than 1,200° C. to 1,800° C., wherein the carbon source substantially consists of benzene or toluene, the carrier gas includes hydrogen in a range of 10% by volume to 85% by volume, and the carrier gas has a linear velocity in a range of 230 cm/min to 2,200 cm/min.

In the above-described method of producing a carbon nanotube-containing composition, the carrier gas includes at least one gas selected from nitrogen, argon, and helium in a range of higher than 15% by volume to lower than 90% by volume.

In the above-described method of producing a carbon nanotube-containing composition, sulfur atoms contained in the sulfur compound are included in a range of 0.15 mol to 0.20 mol per 1 mol of iron atoms included in the ferrocene derivative.

In the above-described method of producing a carbon nanotube-containing composition, the ferrocene derivative is ferrocene.

In the above-described method of producing a carbon nanotube-containing composition, the sulfur compound is thiophene.

In the above-described method of producing a carbon nanotube-containing composition, obtained carbon nanotube aggregates include double-walled carbon nanotubes.

According to the method of producing the carbon nanotube-containing composition, the carbon nanotube aggregates having high purity can be synthesized in high efficiency and high yield.

BRIEF DESCRIPTION OF THE DRAWING

FIG. 1 is a schematic view illustrating a configuration of a synthesizing apparatus that synthesizes carbon nanotube aggregates used in the Examples.

REFERENCE SIGNS LIST

1 SYNTHESIZING APPARATUS
2 MULLITE VERTICAL REACTION TUBE
3 HEATING FURNACE
4 LIQUID SPRAY NOZZLE
5 CARRIER GAS INTRODUCTION PORT
6 MICRO FEEDER
7 PUMP
8, 10, 12 CYLINDER 9, 11, 13 CARRIER GAS FLOWMETER
14 COLLECTING BOX
15 CATALYST AND CARBON SOURCE SOLUTION

DETAILED DESCRIPTION

Hereinafter, detailed descriptions and examples will be described. This disclosure, however, is not limited by the following examples.

First, we provide a method of producing a carbon nanotube-containing composition for synthesizing carbon nanotube aggregates including the step of introducing a ferrocene derivative, a sulfur compound, a carbon source, and a carrier gas into a gas phase flowing in a heating furnace within a temperature range of higher than 1,200° C. and 1,800° C. or lower. The carbon source substantially consists of benzene or toluene. The carrier gas includes hydrogen in an amount of 10% by volume or higher and 85% by volume or lower. The carrier gas has a linear velocity of 230 cm/min or higher and 2,200 cm/min or lower.

It is important that hydrogen is included in the carrier gas at 10% by volume or higher and 85% by volume or lower and the remainder is preferably an inert gas. The term "inert gas" as used herein refers to an inert gas generally referred to, which means a rare gas such as helium, neon, argon, and xenon and a nitrogen gas. The reason why a mixed gas of hydrogen and the inert gas is used as a carrier gas is considered to be that adsorption of hydrogen atoms to an iron particle catalyst surface and activation of the iron particle catalyst surface are involved in decomposition of the carbon source.

In general, hydrogen is considered to activate an iron surface by reducing iron. Hydrogen, however, also has the property of adsorbing on a transition metal surface. Consequently, when the amount of hydrogen is excessively large, the amount of hydrogen adsorbed on the iron particle catalyst surface is so large that a reaction between the iron particle catalyst and the carbon source becomes difficult. This may result in reduction in the yield of the carbon nanotube aggregates. Therefore, the hydrogen is required to be diluted with the appropriate amount of the inert gas to such an extent that the reaction is not inhibited while the hydrogen necessary to activate the iron particle catalyst surface is being ensured. In addition, hydrogen also recovers the thermally decomposed C—H bonds to their original state, whereas hydrogen reacts with an unsaturated bond of the organic compound to promote thermal decomposition. Consequently, the concentration of hydrogen is finally required to be adjusted according to the carbon source to be used.

For these reasons, the content of the hydrogen included in the carrier gas is preferably set within the above range. Preferably, when the total volume ratio of the introduced carrier gas is 100% by volume, the hydrogen gas is 25% by volume or higher and 65% by volume or lower and preferably 30% by volume or higher and 55% by volume or lower. In addition, the content of hydrogen is preferably adjusted to be higher when the ratio of the single-walled CNT is desired to be increased, whereas the content of hydrogen is preferably adjusted to be lower when the ratio of the double-walled CNT is desired to be increased. Considering the balance between the yield and the crystallinity of CNT, the most preferable content of hydrogen is 35% by volume or higher and 45% by volume or lower. From the viewpoint of improving the yield, the content of hydrogen is preferably adjusted to 45% to 85%. By setting the amount of hydrogen included in the carrier gas within the above-described range, carbon nanotube aggregates having high crystallinity and high purity can be synthesized in high yield.

The content of hydrogen most notably affects the easiness of decomposition of the carbon source. In addition to this, the hydrogen content also tends to relate to a change in heat transfer in the carrier gas and the growth rate of the iron particle catalyst. For example, when the synthesis temperature is set to be higher, the carbon source is more likely to be thermally decomposed and thus, to reduce the decomposition amount of the carbon source, the content of hydrogen is preferably adjusted to be higher. On the other hand, when the synthesis temperature is set to be lower, to facilitate decomposition of the carbon source, the content of hydrogen is preferably adjusted to be lower. When the content of hydrogen is lower than 10% by volume, the carbon source is decomposed so much that excessive side reactions take place and thus a large amount of by-products other than CNT are produced. This results in a decrease in the yield of CNT itself. On the other hand, when the content of hydrogen exceeds 85% by volume, decomposition of the carbon source becomes insufficient and the yield of the carbon nanotube aggregates decreases. Consequently, when the influence of other synthesis conditions (temperature, linear velocity of carrier gas, catalyst introduction amount, carbon source ratio, ferrocene derivative ratio, sulfur compound ratio, and the like) is increased, the conditions are preferably determined to be based on the above ranges.

The temperature of the heating furnace is set within a temperature range of 1,150° C. to 1,800° C. or lower to appropriately carry out thermal decomposition of the carbon source (aromatic compound) matching the mixing ratio of the carrier gas. At the time of synthesizing the carbon nanotube aggregates, the raw materials to be used, the catalyst, and the carrier gas flow through a pipe installed in the heating furnace to heat these substances. As the material of the pipe, ceramics, alumina, quartz, silicon carbide, and the like can be used. The pipe becomes more preferable with a thinner wall to easily conduct heat as long as the pipe is thick enough to withstand normal use. In general, a pipe having a thickness of 1 mm or thinner is difficult to handle because the pipe is easy to break. Consequently, when the pipe is used for heating, depending on the material of the pipe, the thickness is usually preferably about 1 mm or thicker and about 5 mm or thinner when the inner diameter of the pipe is about 8 cm or smaller and the thickness is preferably about 5 mm or thicker and about 10 mm or thinner when the inner diameter of the pipe is about larger than 8 cm because the pipe is difficult to break.

The upper limit of the thickness is not particularly limited as long as heat can be efficiently transferred from the heating furnace to the inside of the pipe and the thickness is preferably set to a thickness being easy to handle. In addition, the temperature of the heating furnace at this time refers to a temperature of the thermometer (for example, a thermocouple to measure the temperature) measured by locating the measurement part of the thermometer at a distance within 2 mm from the surface of the pipe through which the carrier gas and the raw materials are passed to synthesize CNT and without contacting the pipe. By using the heating furnace in this temperature range, the carbon nanotube aggregates having high crystallinity and high purity can be obtained in high yield.

In addition, in another example, a method of heating the inside of the pipe for CNT synthesis by inserting a heating element into the pipe instead of heating the pipe from the outside can be used. The temperature of the heating furnace in this case refers to the temperature of a thermometer measured within 2 mm from the surface of the heating element without contacting the measurement part of the thermometer. In addition, in another example, a method of introducing a previously heated carrier gas into the pipe and simultaneously heating the pipe from outside can also be used. In this case, the temperature of the heating furnace refers to a higher temperature between the temperature measured at the time of installing the measurement part of a thermometer at the center of the pipe (position evenly far from the wall surface) and the temperature measured at a position where the distance from the outer surface of the pipe is within 2 mm.

As the temperature of the heating furnace becomes higher, the carbon nanotube aggregates can be synthesized more efficiently and thus the temperature is preferably set as high as possible. Considering the material of the facility and the durability of the heating element, however, the upper limit is generally about 1,800° C. When the temperature is higher than 1,200° C. and 1,700° C. or lower, the conditions for obtaining highly crystalline carbon nanotube aggregates in high yield are easy to adjust, which is preferable. The temperature of the heating furnace is preferably higher temperature from the viewpoint of ease of decomposition of the carbon source. From the viewpoint of ease of control, however, the temperature is more preferably higher than 1,200° C. and 1,500° C. or lower and, for the same reason, the temperature is most preferably controlled to 1,250° C. or higher and 1,400° C. or lower because an appropriate decomposition rate is difficult to adjust in consideration of other synthesis conditions.

For example, when the heating furnace using a common Kanthal wire as the heating element is used, the temperature can be adjusted to 1,400° C. or lower and thus the temperature can be simply adjusted to higher than 1,200° C. and 1,400° C. or lower. When the heating furnace using a heating element having higher purity or a heating element durable to high temperature (for example, Cantal Super and Keramax) is used, the temperature can also be adjusted to higher than 1,150° C. to 1,800° C. From the viewpoint that the carbon source is more easily decomposed by adjusting at a higher temperature, the temperature is preferably adjusted to higher than 1,200° C. and 1,800° C. or lower.

Sufficient thermal decomposition of aromatic compounds that are relatively difficult to thermally decompose is important. Therefore, when sufficient heating cannot be carried out, the carrier gas is also preferably previously preheated to 200° C. or higher and 1,100° C. or lower. As the preheating temperature becomes higher, decomposition of the carbon source in the heating furnace is more preferably carried out because the decomposition occurs more smoothly. The preheating temperature is more preferably 400° C. or higher and 1,100° C. or lower, further preferably 500° C. or higher and 1,100° C. or lower, further more preferably 600° C. or higher and 1,100° C. or lower, and most preferably 700° C. or higher and 1,000° C. or lower. When the preheating temperature is excessively high, the carbon source will be completely decomposed before synthesis of the carbon nanotube aggregates begins so that the upper limit of the preheating temperature is at most 1,100° C.

When heating is carried out using a general tubular furnace as the heating furnace, the length of the heating zone is preferably longer to sufficiently heat the flowing carbon source. Depending on the size of the pipe in which the carbon source flows and is heated, when the pipe having an inner diameter of about 1 cm to 20 cm that is generally easily available is used, the heating zone preferably has a length of 60 cm or longer, more preferably 100 cm or longer, and further preferably 150 cm or longer. As the length of the heating zone becomes longer, the heating zone is preferable. The heating zone having a length of at most about 150 cm, however, is considered to be sufficient because the carbon source is completely decomposed if the heating zone is excessively long.

By using benzene or toluene as a carbon source within the temperature range of the heating furnace and in the range of the mixing ratio of hydrogen and inert gas, highly pure carbon nanotube aggregates can be synthesized in remarkably high yield and high efficiency compared to the general floating catalyst method of the same scale in the known example. Carbon nanotube aggregates having high crystallinity and high purity can be synthesized by using a carbon source consisting essentially of the aromatic compound as the carbon source.

As the carbon source, benzene or toluene can be suitably used. Benzene or toluene can be suitably used as a carbon source from the viewpoint that side reactions are less likely to occur. Benzene is the most preferable carbon source from the viewpoint that the side reactions are less likely to occur due to the absence of a functional group and that highly pure carbon nanotube aggregates can be obtained. In addition, toluene is also preferable as a carbon source because toluene is easy to handle from the viewpoint that volatility is not too high and not too low and toluene causes few side reactions.

A carbon source consisting essentially of benzene or toluene is used as the carbon source. However, for the purpose of adjusting a specific heat, adjusting the degree of activity of the catalyst, or other reasons, aliphatic or alicyclic hydrocarbons (for example, methane, ethane, ethylene, acetylene, propane, propene, butane, butene, pentane, cyclopentane, hexane, cyclohexane, and decalin) may be mixed within the range not impairing the desired effect. The upper limit of the addition amount is determined so that the number of the carbon atoms of the hydrocarbon to be added is 15% or lower relative to the introduction number of carbon atoms forming the aromatic ring of benzene or toluene to be introduced. From the viewpoint of the yield and the purity of the carbon nanotube aggregates to be obtained, as the addition amount of the hydrocarbon becomes smaller, the carbon source is more preferable. When the hydrocarbon is added to adjust the activity of the catalyst, the addition amount is preferably 5% or lower.

When the hydrocarbon is excessively added, the side reactions excessively occur and thus the yield of the carbon nanotube aggregates may often be lowered due to inactivation of the catalyst or the like or the rate of thermal decomposition and the rate of catalyst particle growth do not match and thus carbon by-products may often be produced in a large quantity. In addition, a compound that is not in the form of an aromatic compound before being introduced into the heating furnace, but is converted into an aromatic compound after being introduced into the heating furnace (for example, a compound such as an iron complex having a structure in which a part of an aromatic ring is oxidatively added to an iron atom that generates an aromatic ring by reductive elimination in the course of thermal decomposition) also exists. The existence of such a compound is substantially the same as the use of the aromatic compound as the carbon source and thus such a compound can also be used.

A ferrocene derivative is simultaneously introduced with the carbon source as an iron source producing the iron particle catalyst. The reason why the ferrocene derivative is preferable is presumably that the decomposition rate of the skeleton around the iron atom of the molecule having the ferrocene skeleton and the formation rate of the iron particles associated with the decomposition may be moderately preferable within the determined mixing ratio of the carrier gas and the temperature range. As the ferrocene derivative, a ferrocene derivative having a functional group having up to 6 carbon atoms or a ferrocene derivative having an aromatic group and including at most 6 atoms (excluding hydrogen) other than carbon atoms in the functional group, for example, a ferrocene derivative having a functional group such as a methyl group, an ethyl group, a propyl group, a butyl group, a pentyl group, an acetyl group, a carboxy group, a hydroxy group, an amino group, and an epoxy group can be used and a ferrocene derivative having an aromatic group such as a phenyl group, an anisyl group, and a phenol group and having a heterocyclic compound including a hetero atom as a functional group can also be used. The heteroatom has a property of adsorbing to a transition metal and thus, in our range, has a function of activating the catalyst surface when the amount of the heteroatom is small as described above. However, as with hydrogen, when the heteroatom is introduced in an excessively large amount, the reaction will be affected. Therefore, the less amount of the heteroatom is preferable.

In addition, when the aromatic group has a simple structure such as a phenyl group, the aromatic group acts as a carbon source similar to the carbon source of the aromatic compound after decomposition and thus no particular problem arises. However, in hydrocarbons and other non-aromatic functional groups, the functional group having carbon atoms is left from ferrocene in the course of thermal decomposition and decomposes at a different rate from the aromatic compound to act as a carbon source. However, when the amount of the functional groups is excessively large, the balance with the growth rate of the iron particle catalyst is shifted and thus the side reactions proceed. Consequently, the amount of the functional groups is preferable to the extent as described above. When the amount of the functional groups is to the extent as described above, the functional groups do not only inhibit the reaction, but also are reacted with the small amount of the iron particle catalyst deviating from the optimum conditions to provide the carbon nanotube aggregates and, as a result, the functional groups hardly affect the reaction. However, ferrocene is most preferably used from the viewpoint of easy formation of uniform carbon nanotube aggregates provided by the uniformity of the decomposition. In addition, ferrocene is preferable as compared with other ferrocene derivatives from the viewpoint of ease of handling.

The reason why the sulfur compound is necessary is not clear. The reason, however, is presumed to be that the direction in which CNT grows from the iron particle catalyst surface is determined by nonuniformly mixing the sulfur element in the iron particle catalyst. Therefore, even when the type of the sulfur compound is changed, the carbon nanotube aggregates can be synthesized in remarkably high yield and high efficiency, compared to a similar general floating catalyst method having the same scale. The reason is considered to be that, in our temperature range, the C—S bond or the S—S bond of the sulfur compound is easily cleaved and the sulfur compound is easily decomposed in the reaction tube and thus influence of the change in the kind of the sulfur compound is small and the synthesis is carried out in high yield and high efficiency. Examples of the suitable sulfur compound include sulfur (crystalline form and non-crystalline form), a thiophenol derivative, a phenyl sulfide derivative, a phenyl disulfide derivative, carbon disulfide, and a thiophene derivative. A compound in which the number of other atoms with respect to the sulfur atom is 10 or less is preferably used and thiophene is more preferably used. The reason for this is considered to be that the decomposition rate is the most suitable rate and no functional groups inducing side reactions are included.

The ratio of the carbon source, the ferrocene derivative, and the sulfur compound is preferably 1 part by weight or more and 10 parts by weight or less of the ferrocene derivative and 1 part by weight or more and 10 parts by weight or less of the sulfur compound relative to 50 parts by weight or more and 250 parts by weight or less of the carbon source. In addition, in a liquid carbon source, the supply amount of the carbon source is preferably adjusted to about 10 µL/min or higher and about 400 µL/min or lower. When the supply amount is large, the carbon source tends to be wasted. On the other hand, when the supply amount is small, the catalyst tends to be wasted and thus side reactions easily occur. Consequently, the supply amount is more preferably adjusted to 50 µL/min or higher and 300 µL/min or lower. The most preferable supply amount is 75 µL/min or higher and 150 µL/min or lower.

In a solid carbon source, the solid carbon source is preferably supplied by melting or supplied by sublimating the solid carbon source. The supply amount thereof is preferably calculated so that the supply amount in the solid carbon source corresponds to the supply amount in the liquid carbon source to be equalized in terms of the number of moles. In addition, when the decomposition temperature and the decomposition rate of the carbon source, the ferrocene derivative, and the sulfur compound are different from each other and the heating method of the heating furnace is different, the decomposition rate is shifted and thus the ratio of the carbon source, the ferrocene derivative, and the sulfur is required to be finely adjusted. The carbon source, the ferrocene derivative, and the sulfur compound are preferably mixed and collectively introduced as a catalyst and carbon source solution into the heating furnace. By introducing them collectively, the carbon source, the ferrocene derivative, and the sulfur compound can be introduced into the heating furnace while the ratio of them is being kept constant.

Consequently, the carbon source is preferably in a liquid state at normal temperature and normal pressure from the viewpoint of ease of handling. In the carbon source in a liquid state, even when the ferrocene derivative and the sulfur compound are solid, these substances can be dissolved in the carbon source in a liquid state to form a catalyst and carbon source solution. When the carbon source is solid, the carbon source may be melted and mixed with the ferrocene derivative and the sulfur compound. Alternatively, when there is a reason to separately introduce the raw materials into the heating furnace, the synthesis is preferably carried out after providing a mechanism to mix in the heating furnace so that the ratio of each of the carbon source, the ferrocene derivative, and the sulfur compound is kept constant.

The temperature range of the synthesis of the carbon nanotube aggregates using the aromatic compound as the carbon source, the mixed gas of hydrogen and the inert gas as a carrier gas, and the ferrocene derivative and the sulfur compound is preferably higher than 1,150° C. and 1,800° C. or lower. As the reason why this temperature is relatively higher than that of the known floating catalyst method, one reason is that aromatic compounds are used as the carbon source. Aromatic compounds generally require a higher temperature for decomposition than that of saturated hydrocarbons. When the carbon nanotube aggregates are synthesized at a low temperature, only a part of carbon sources are decomposed and thus the yield does not increase. Therefore, when the synthesis is carried out at relatively low temperature, hydrocarbons and alcohols are often used as carbon sources. The yield, however, is usually not so high.

In addition, the reason why the yield of highly pure carbon nanotube aggregates is remarkably high under our conditions may be that the synthesis is carried out at relatively high temperature. Thermal decomposition of a carbon source is generally an endothermic reaction in which the carbon source is decomposed by heating. When a large amount of carbon nanotube aggregates are intended to be efficiently and continuously synthesized, a large amount of the carbon source is required to be charged and a large amount of heat is required. When a carbon source decomposing at relatively low temperature is used, however, setting the synthesis temperature at remarkably high temperature causes significant side reactions, which causes a decrease in yield. Therefore, when the carbon nanotube aggregates are synthesized at a high temperature, the aromatic compound that decomposes at a relatively high temperature is used as the carbon source so that side reactions are less likely to occur, much heat can be added, and this carbon source is suitable for mass production.

For the above-described reasons, the synthesis temperature is more preferably higher than 1,200° C. and 1,400° C. or lower, which is a higher temperature. Although the reason is not clear, when the temperature is excessively high, uniformity of the carbon nanotube aggregates (diameter distribution and crystallinity) tends to be disturbed and difficult to adjust. As a result, the quality of the carbon nanotube aggregates may deteriorate. Consequently, when the temperature is higher than 1,200° C. and 1,300° C. or lower, the uniformity as well as the yield and efficiency of the carbon nanotube aggregates can be easily secured, which is most preferable. When the yield and the efficiency are considered, however, the temperature is preferably adjusted to 1,250° C. or higher and 1,400° C. or lower, depending on the linear velocity of the carrier gas and the mixing ratio, even if some disturbance occurs.

As a rough target of the adjustment, the temperature is appropriately adjusted to a higher temperature side as the linear velocity of the carrier gas is increased, whereas the temperature is adjusted to a lower temperature side as the ratio of the inert gas is increased. When the linear velocity of the carrier gas is increased, the temperature is required to be raised because a lot of heat is taken away. When the ratio of the inert gas is changed, the temperature is required to be adjusted to a higher temperature when heat is difficult to transmit and the temperature is required to be adjusted to a lower temperature when heat is easy to transmit with reference to specific heat, because the thermal conductivity in the carrier gas changes. In addition, as described above, decomposition of the carbon source tends to be reduced when the concentration of hydrogen is increased and thus, when the content of hydrogen is increased, the temperature is appropriately adjusted to a higher temperature to promote the thermal decomposition of the carbon source. On the other hand, when the content of hydrogen is lowered, the temperature is required to be adjusted to a lower temperature to prevent the side reactions from proceeding because the decomposition of the carbon source becomes easy to proceed.

The reason why the linear velocity of the carrier gas is 230 cm/min or higher and 2,200 cm/min or lower is considered to be related to the thermal conductivity of the carrier gas and the thermal decomposition rate of the carbon source to be used. When the linear velocity is adjusted within the above range depending on the difference in heat transfer, the carbon nanotube aggregates can be synthesized in high yield. Consequently, when the temperature is preferably set relatively high, the linear velocity of the carrier gas is adjusted to a higher velocity, whereas when the temperature is preferably set relatively low, the linear velocity of the carrier gas is adjusted to a lower velocity. In addition, variation of the convective state of the carrier gas depending on the linear velocity is also considered to affect the synthesis. When a general heating furnace having a heating zone length of about 1 m or shorter (such as an electric tube furnace using Kanthal wire) is used, the linear velocity of the carrier gas adjusted to 230 cm/min or higher and 1,400 cm/min or lower allows the highly pure carbon nanotube aggregates to be obtained in high yield. In addition, when higher yield is desired to be obtained by making the heating zone longer than 1 m, the carbon nanotube aggregates can be obtained in higher yield by adjusting the linear velocity of the carrier gas to higher than 1,400 cm/min and 2,200 cm/min or lower.

In addition, as a rough target of combining with other synthesis conditions for synthesizing the highly pure carbon nanotube aggregates in high yield, the linear velocity of the carrier gas is preferably adjusted to 230 cm/min or higher and 1,400 cm/min or lower, when the heating furnace temperature is higher than 1,150° C. and 1,300° C. or lower, the linear velocity of the carrier gas is preferably adjusted to 1,100 cm/min or higher and 2,200 cm/min or lower, when the heating furnace temperature is higher than 1,300° C. and 1,600° C. or lower, and the linear velocity of the carrier gas is preferably adjusted to 1,600 cm/min or higher and 2,200 cm/min or lower, when the heating furnace temperature is higher than 1,600° C. and 1,800° C. or lower. However, depending on the purpose of what kind of carbon nanotube aggregates are required such as when highly pure carbon nanotube aggregates are required even if the yield is somewhat sacrificed, or when the yield is desired to increase even if the purity is somewhat sacrificed, the carbon nanotube aggregates can also be synthesized under conditions outside the above range depending on other condition settings.

In addition, in the mixing ratio of the carrier gas, the linear velocity of the carrier gas is preferably adjusted to a faster velocity when the thermal conductivity of the carrier gas becomes higher, whereas the linear velocity of the carrier gas is preferably adjusted to a slower velocity when the thermal conductivity becomes lower. Through these adjustments, the aromatic compound as the carbon source is suitably thermally decomposed and the carbon nanotube aggregates are efficiently synthesized. Since the region where the linear velocity of the carrier gas is slow is influenced by convection, the other synthesis conditions are difficult to adjust. In the region where the linear velocity of the carrier gas is fast, the errors of the other synthesis conditions tend to become large. Consequently, the range of the linear velocity of the carrier gas that is more easily adjustable is preferably 500 cm/min or higher and 1,800 cm/min or lower. When the linear velocity is 900 cm/min or higher and 1,400 cm/min or lower, the other synthesis conditions are easily adjusted.

Carbon nanotube aggregates having any ratio of 20% or higher of the double-walled CNT can be synthesized and, under suitable conditions, carbon nanotube aggregates in which the amount of the double-walled CNT is 50% or higher can be synthesized. The term "50% or higher" used herein means that when 200 CNTs are observed with a transmission electron microscope, 100 or more CNTs observed are double-walled CNTs. The counting of 200 CNTs is carried out by observing the CNTs at a magnification of 250,000 times or higher with a transmission electron microscope, observing more than 20 visual fields of the visual fields in which the diameter and the number of layers of 10 or more CNTs in one visual field can be determined, and counting the number of layers and the number of CNTs in each of the visual fields. The same applies to other arbitrary ratios.

Although the reason is not clear, the double-walled CNT has a higher carbon consumption rate per unit time for growing than that of the single-walled CNT in the adjustment method of the double-walled CNT at an arbitrary ratio. Consequently, the ratio of the formation of the double-walled CNT increases when the synthesis conditions are adjusted in such a direction that the thermal decomposition amount of the carbon source in the system increases, whereas the ratio of formation of the double-walled CNT decreases when the conditions are adjusted such that the carbon source thermally decomposed in the system decreases. For example, when the volume ratio of hydrogen in the carrier gas is decreased, the ratio of the double-walled CNT in the carbon nanotube aggregates is increased, whereas when the volume ratio of hydrogen in the carrier gas is increased, the ratio of the double-walled CNT is decreased.

In addition, as the synthesis temperature is increased, the ratio of the double-walled CNT in the carbon nanotube aggregates increases, whereas as the synthesis temperature is decreased, the ratio of the double-walled CNT is decreased. In addition, as the linear velocity of the carrier gas is decreased, the ratio of the double-walled CNT in the carbon nanotube aggregates is increased, whereas as the linear velocity of the carrier gas is increased, the ratio of the double-walled CNT is decreased. In addition, as the carbon source introduction amount is increased, the ratio of the double-walled CNT in the carbon nanotube aggregates is increased, whereas as the carbon source introduction amount is decreased, the ratio of the double-walled CNT is decreased. The ratio of the hydrogen gas in the carrier gas and the synthesis temperature provide the most significant influence on the ratio of the double-walled CNT.

As a rough target of the conditions that the double-walled CNT is included in an amount of 50% or higher, the synthesis temperature is 1,150° C. or higher and 1,800° C. or lower and more preferably 1,200° C. or higher and 1,800° C. or lower. When the synthesis temperature is higher, the carbon source decomposes more efficiently and the double-walled CNT is easy to synthesize. Therefore, the synthesis temperature is more preferably 1,250° C. or higher and 1,800° C. or lower and the carbon nanotube aggregates are preferably synthesized at 1,250° C. or higher and 1,500° C. or lower from the viewpoint of ease of adjustment of other synthesis conditions. The hydrogen ratio in the carrier gas is 10% by volume or higher and 85% by volume or lower. The carbon source tends to be decomposed with less hydrogen and thus the hydrogen ratio is preferably 10% by volume or higher and 60% by volume or lower and more preferably 15% by volume or higher and 50% by volume or lower. From the viewpoint of the purity of the carbon nanotube aggregates, hydrogen ratio is preferably 25% by volume or higher and 45% by volume or lower. The carbon source introduced amount is preferably as much as possible to the extent that unfavorable side reactions do not occur. In addition, the linear velocity of the carrier gas may be arbitrary within our range. When the adjustment cannot be carried out under the above-described condition setting, the ratio of the double-walled CNT can be increased by slowing the linear velocity of the carrier gas.

In addition, in another example, the introduction ratio of the ferrocene derivative and the sulfur compound is adjusted such that the sulfur atoms contained in the sulfur compound are 0.14 mol or more and 0.22 mol or less per 1 mol of the iron atoms included in the ferrocene derivative, whereby the carbon nanotube aggregates including 50% or higher of the single-walled CNT can be obtained. By avoiding the above-described conditions for increasing double-walled CNT, the single-walled CNT can be more suitably obtained. From the viewpoint of increasing the ratio of the single-walled CNT in the carbon nanotube aggregates, the above-described ratio is more preferably adjusted to 0.15 mol or more and 0.22 mol or less and most preferably adjusted to 0.15 mol or more and 0.20 mol or less.

According to our method of producing a carbon nanotube-containing composition, carbon nanotube aggregates having a G/D ratio of 50 or higher can be synthesized in high yield and, under suitable conditions, the carbon nanotube aggregates having a G/D ratio of 80 or higher, which is generally considered to be high purity, can be synthesized. Under more suitable conditions, the carbon nanotube aggregates having a G/D ratio of 100 or higher, which means that the carbon nanotube aggregates have remarkably high purity, can be synthesized. The term "G/D ratio" used herein means the ratio of the height of the G band to the height of the D band in Raman spectrum by Raman spectroscopic analysis using laser light having a wavelength of 532 nm.

According to the method of producing a carbon nanotube-containing composition, excellent carbon nanotube aggregates having a peak temperature of the differential curve (DTG) of a TGA curve in a thermogravimetric measurement (TG) of 600° C. or higher is obtained. More preferably, remarkably highly crystalline and excellently pure carbon nanotube aggregates having a peak temperature of 750° C. can be obtained in high yield. In addition, under more preferable conditions, carbon nanotube aggregates in which the peak temperature of the differential curve (DTG) of the TGA curve is 800° C. or higher can be obtained in high yield. The term "DTG curve" used herein means the differential curve (DTG) of a TGA curve when a sample of about 1 mg is placed in a differential thermal analyzer (for example, DTG-60, manufactured by Shimadzu Corporation) and the temperature is raised from room temperature to 950° C. at a temperature rising rate of 10° C./min in air.

The reason why the remarkably highly pure carbon nanotube aggregates can be obtained in high yield by the method of producing a carbon nanotube-containing composition is not clear. The combination with the above-described synthesis conditions when the aromatic compound is used as the carbon source, however, is considered to be significantly suitably effective.

EXAMPLES

Hereinafter, methods will be described more specifically with reference to Examples. The following Examples facilitate understanding of our examples and the examples are not limited to them. In other words, modifications and other examples based on the technical idea of the present examples are included.

Raman Spectroscopic Analysis

A powder sample was placed in a resonance Raman spectrometer (INF-300, manufactured by HORIBA Jobin Yvon GmbH) and measurement was made using a laser wavelength of 532 nm. When the G/D ratio was measured, the analysis was carried out at three different parts of the sample, and the arithmetic mean thereof was determined.

Thermal Analysis

Approximately 1 mg of a sample was placed in a differential thermal analyzer (DTG-60, manufactured by Shimadzu Corporation) and the temperature was raised from room temperature to 950° C. at a temperature rising rate of 10° C./min in air. The peak temperature of weight loss was read from the differential curve (DTG) of the TGA curve at this time.

High Resolution Transmission Electron Micrograph

In 1 mL of ethanol, 1 mg of carbon nanotube aggregates were placed and dispersion treatment was carried out using an ultrasonic bath for about 15 minutes. A few droplets of the dispersed sample were dropped on a grid and dried. The grid on which the sample was applied as described above was placed in a transmission electron microscope (JEM-2100, manufactured by JEOL Ltd.) and measurement was made. The measurement magnification was determined to be 300,000 times and the acceleration voltage was determined to be 120 kV.

Synthesis of Carbon Nanotube Aggregates

Using a vertical production apparatus shown in FIG. 1, carbon nanotube aggregates described in the following Examples were synthesized. FIG. 1 is a schematic view of the apparatus that synthesizes carbon nanotube aggregates according to the Examples. The synthesizing apparatus 1 illustrated in FIG. 1 includes a mullite vertical reaction tube 2, a heating furnace 3, a liquid spray nozzle 4, a carrier gas introduction port 5, a micro-feeder 6, a pump 7, cylinders 8, 10, 12, a carrier gas flowmeter 9, 11, 13, and a collecting box 14.

The mullite vertical reaction tube 2 is a reaction tube to synthesize carbon nanotube aggregates having an inner diameter of 52 mm, an outer diameter of 60 mm, a length of 1500 mm, and an inner effective heating length of 1100 mm. The heating furnace 3 is a device located around the outer periphery of the mullite vertical reaction tube 2, generates heat by energization, and heats the inside of the mullite vertical reaction tube 2 by the generated heat. The liquid spray nozzle 4 is located at an upper flange 2a of the mullite vertical reaction tube 2 and sprays a carbon source made of an aromatic compound into the mullite vertical reaction tube 2 in a mist form. The carrier gas introduction port 5 is located at the upper flange 2a of the mullite vertical reaction tube 2 and introduces the carrier gas into the mullite vertical reaction tube 2.

The micro-feeder 6 stores a catalyst and carbon source solution 15 prepared by mixing the aromatic compound in a liquid state at normal temperature and normal pressure as the carbon source, ferrocene (manufactured by Wako Pure Chemical Industries, Ltd.) being an organic transition metal compound, and thiophene (manufactured by KANTO CHEMICAL CO., INC.) being an organic sulfur compound. The pump 7 adjusts the supply amount of the catalyst and carbon source solution 15 from the micro-feeder 6 to the liquid spray nozzle 4. The cylinder 8 stores a carrier gas also serving as a gas for spraying the catalyst and carbon source solution. The carrier gas flowmeter 9 adjusts the flow rate of the carrier gas supplied from the cylinder 8 to the liquid spray nozzle 4. The cylinder 10 stores hydrogen as the carrier gas. The carrier gas flowmeter 11 adjusts the carrier gas flow rate supplied from the cylinder 10 to the carrier gas introduction port 5. The cylinder 12 stores an inert gas as the carrier gas. The carrier gas flowmeter 13 adjusts the carrier gas flow rate supplied from the cylinder 12 to the carrier gas introduction port 5.

The collecting box 14 is located under a lower flange 2b of the mullite vertical reaction tube 2 and separates the synthesized carbon nanotube aggregates and the synthesized product other than the carbon nanotube aggregates with a metal mesh 14a to collect the carbon nanotube aggregates. In addition, a waste gas pipe 14b for the mixed carrier gas after synthesis exhausted as an exhaust gas is located in the lower part of the collecting box 14.

The linear velocities of various introduced carrier gases in the reaction tube, the kinds and amounts of the catalyst and carbon source solutions, the synthesis temperatures, the G/D ratios by the Raman spectrum measurement, and the DTG peak temperatures are listed in the following Table 1. In addition, as a comparison, Comparative Examples are listed in the following Table 3.

Comparative Example 12, Examples 2 to 17

Comparative Example 12 and Examples 2 and 3 are examples when the linear velocity of the carrier gas is changed. In every case, highly pure carbon nanotube aggregates were able to be synthesized in a yield of 1.5 g/h or higher. Examples 4 to 7 are examples in which the content of hydrogen is changed. In every case, carbon nanotube aggregates having a high G/D ratio and high heat resistance were able to be synthesized in a remarkably high yield of 1.6 g/h or higher. Example 8 is an example in which the type of the inert gas is changed to nitrogen. Example 9 is an example when the carbon source is changed from toluene to benzene and Examples 10 and 11 are examples in which the synthesis temperature is changed. In every case, excellent carbon nanotube aggregates were synthesized in high yield.

Example 12 is an example showing that high quality carbon nanotube aggregates can be obtained in higher yield by adjusting the synthesis conditions. Example 13 is an example in which the introduction amount of the catalyst and carbon source solution was increased and the linear velocity of the carrier gas increased from the conditions of Example 12, and, as a result, the yield of the highly pure carbon nanotube aggregates was further increased. Table 2 lists examples in which each of carbon nanotube aggregates having a ratio of the single-walled CNT of 50% or higher and carbon nanotube aggregates having a ratio of the double-walled CNT of 50% or higher can be separately produced by adjusting the molar ratio of simultaneously introduced sulfur atoms to the number of moles of iron atoms introduced as a catalyst and the layer number ratios of the CNTs contained in the carbon nanotube aggregates to show that the ratio of the double-walled CNT in the high quality carbon nanotube aggregates obtained in high yield can be adjusted by various other synthesis conditions (Examples 5, 14 to 17).

Comparative Examples 1 to 11

Comparative Examples 1 to 3 are examples in which carbon nanotube aggregates were synthesized using decalin (decahydronaphthalene) being an aliphatic hydrocarbon as the carbon source instead of the aromatic compound. The yields were significantly low and the purities of the carbon nanotube aggregates determined from G/D ratios and DTG peak temperatures were also significantly low. In addition, Comparative Examples 4 to 6 are synthesis examples when a gaseous hydrocarbon is additionally introduced. When ethylene or methane was additionally introduced or both of ethylene and methane were additionally introduced at the same time, the yields of substantially obtained carbon nanotube aggregates were small because the purity was high but the yield was low or the yield was high but the purity was significantly low. The ratio of the number of carbon atoms of the additional carbon source to the number of carbon atoms forming the aromatic ring of the introduced aromatic compound (toluene) was 34% in Comparative Example 4, 95% in Comparative Example 5, or 455% in Comparative Example 6.

Comparative Example 7 is an example when the synthesis temperature was 1,100° C. No carbon nanotube aggregates were produced. Comparative Example 8 is an example when the carrier gas is 100% hydrogen and, also in this case, no carbon nanotube aggregates were able to be obtained. In addition, as shown in Comparative Example 9, when the carrier gas was 100% of argon, amorphous carbon was mainly produced and almost no carbon nanotube aggregates were produced. Comparative Example 10 is an example in which the sulfur compound was not introduced and amorphous carbon was mainly produced and almost no carbon nanotube aggregates were produced. Comparative Example 11 is an example in which no ferrocene derivative was introduced and no recoverable carbon materials were produced.

TABLE 1

Synthesis conditions of carbon nanotube aggregates

| | | | | (Catalyst and carbon source solution) | |
| --- | --- | --- | --- | --- | --- |
| | Carrier gas (type and volume ratio) | Carrier gas linear velocity (cm/min) | Synthesis temperature (° C.) | Type and molar ratio of carbon source/ferrocene derivative/sulfur compound | Number of moles of sulfur atom to number of moles of iron atom |
| Comparative Example 12 | Argon/hydrogen = 70/30 | 377 | 1250 | Toluene/ferrocene/thiophene = 25.239/1/0.221 | 0.221 |
| Example 2 | Argon/hydrogen = 70/30 | 565 | 1250 | Toluene/ferrocene/thiophene = 25.239/1/0.221 | 0.221 |
| Example 3 | Argon/hydrogen = 70/30 | 753 | 1250 | Toluene/ferrocene/thiophene = 25.239/1/0.221 | 0.221 |
| Example 4 | Argon/hydrogen = 80/20 | 565 | 1250 | Toluene/ferrocene/thiophene = 37.858/1/0.221 | 0.221 |
| Example 5 | Argon/hydrogen = 60/40 | 659 | 1250 | Toluene/ferrocene/thiophene = 37.858/1/0.221 | 0.221 |
| Example 6 | Argon/hydrogen = 50/50 | 659 | 1250 | Toluene/ferrocene/thiophene = 25.239/1/0.221 | 0.221 |
| Example 7 | Argon/hydrogen = 40/60 | 659 | 1250 | Toluene/ferrocene/thiophene = 25.239/1/0.221 | 0.221 |
| Example 8 | Nitrogen/hydrogen = 60/40 | 659 | 1250 | Toluene/ferrocene/thiophene = 37.858/1/0.221 | 0.221 |
| Example 9 | Argon/hydrogen = 70/30 | 565 | 1250 | Benzene/ferrocene/thiophene = 101.821/1/0.276 | 0.276 |
| Example 10 | Argon/hydrogen = 70/30 | 565 | 1300 | Toluene/ferrocene/thiophene = 75.713/1/0.221 | 0.276 |
| Example 11 | Argon/hydrogen = 60/40 | 659 | 1200 | Toluene/ferrocene/thiophene = 37.858/1/0.221 | 0.221 |
| Example 12 | Nitrogen/hydrogen = 50/50 | 942 | 1290 | Benzene/ferrocene/thiophene = 35.727/1/0.221 | 0.221 |
| Example 13 | Nitrogen/hydrogen = 50/50 | 1271 | 1290 | Benzene/ferrocene/thiophene = 35.727/1/0.221 | 0.221 |
| Example 14 | Nitrogen/hydrogen = 60/40 | 845 | 1250 | Toluene/ferrocene/thiophene = 30.287/1/0.133 | 0.133 |
| Example 15 | Nitrogen/hydrogen = 60/40 | 845 | 1250 | Toluene/ferrocene/thiophene = 30.287/1/0.177 | 0.177 |
| Example 16 | Nitrogen/hydrogen = 60/40 | 845 | 1250 | Toluene/ferrocene/thiophene = 30.287/1/0.221 | 0.221 |
| Example 17 | Nitrogen/hydrogen = 60/40 | 845 | 1250 | Toluene/ferrocene/thiophene = 30.287/1/0.265 | 0.265 |

| | Synthesis conditions of carbon nanotube aggregates | | Yield and properties | | |
| --- | --- | --- | --- | --- | --- |
| | Separately added carbon unit 1.0E−3 mol/min | Introduced amount of catalyst and carbon source solution | G/D ratio (at 532 nm) | DTG peak temperature (° C.) | Yield of carbon nanotube aggregates |
| Comparative Example 12 | None | 150 μL/min | 60 | 600 | 2.3 (g/h) |
| Example 2 | None | 150 μL/min | 142 | 830 | 1.5 (g/h) |
| Example 3 | None | 150 μL/min | 133 | 830 | 1.6 (g/h) |
| Example 4 | None | 150 μL/min | 81 | 812 | 1.6 (g/h) |
| Example 5 | None | 150 μL/min | 133 | 817 | 1.6 (g/h) |
| Example 6 | None | 150 μL/min | 135 | 800 | 1.7 (g/h) |
| Example 7 | None | 150 μL/min | 214 | 645 | 1.6 (g/h) |
| Example 8 | None | 150 μL/min | 179 | 823 | 1.7 (g/h) |
| Example 9 | None | 150 μL/min | 104 | 818 | 1.3 (g/h) |
| Example 10 | None | 100 μL/min | 124 | 841 | 1.2 (g/h) |
| Example 11 | None | 150 μL/min | 100 | 801 | 1.0 (g/h) |
| Example 12 | None | 210 μL/min | 103 | 808 | 4.5 (g/h) |
| Example 13 | None | 290 μL/min | 125 | 801 | 6.1 (g/h) |
| Example 14 | None | 160 μL/min | 125 | 825 | 1.5 (g/h) |
| Example 15 | None | 160 μL/min | 124 | 866 | 1.8 (g/h) |
| Example 16 | None | 160 μL/min | 83 | 855 | 2.0 (g/h) |
| Example 17 | None | 160 μL/min | 124 | 849 | 1.9 (g/h) |

TABLE 2

| | Distribution of number of walls (%) | | |
|---|---|---|---|
| | Single-walled | Double-walled | Triple-walled |
| Example 5 | 27.9 | 63.5 | 6.7 |
| Example 14 | 36.2 | 57.4 | 6.4 |
| Example 15 | 68.3 | 27.9 | 3.8 |
| Example 16 | 31.7 | 64.8 | 3.5 |
| Example 17 | 22.5 | 45.8 | 31.7 |

TABLE 3

| | Synthesis conditions of carbon nanotube aggregates | | | (Catalyst and carbon source solution) | |
|---|---|---|---|---|---|
| | Carrier gas (type and volume ratio) | Carrier gas linear velocity (cm/min) | Synthesis temperature (° C.) | Type and molar ratio of carbon source/ferrocene derivative/sulfur compound | Number of moles of sulfur atom to number of moles of iron atom |
| Comparative Example 1 | Argon/hydrogen = 70/30 | 942 | 1250 | Decalin/ferrocene/thiophene = 25.231/1/1.106 | 1.106 |
| Comparative Example 2 | Argon/hydrogen = 70/30 | 377 | 1200 | Decalin/ferrocene/thiophene = 38.015/1/2.211 | 2.211 |
| Comparative Example 3 | Argon/hydrogen = 50/50 | 659 | 1250 | Decalin/ferrocene/thiophene = 25.231/1/0.221 | 0.221 |
| Comparative Example 4 | Argon/hydrogen = 60/40 | 659 | 1200 | Toluene/ferrocene/thiophene = 50.478/1/0.553 | 0.533 |
| Comparative Example 5 | Argon/hydrogen = 60/40 | 565 | 1250 | Toluene/ferrocene/thiophene = 25.239/1/0.221 | 0.221 |
| Comparative Example 6 | Argon/hydrogen = 50/50 | 330 | 1200 | Toluene/ferrocene/thiophene = 50.478/1/0.553 | 0.533 |
| Comparative Example 7 | Argon/hydrogen = 60/40 | 659 | 1100 | Toluene/ferrocene/thiophene = 37.858/1/0.221 | 0.221 |
| Comparative Example 8 | Argon/hydrogen = 0/100 | 659 | 1250 | Toluene/ferrocene/thiophene = 37.858/1/0.221 | 0.221 |
| Comparative Example 9 | Argon/hydrogen = 100/0 | 659 | 1250 | Toluene/ferrocene/thiophene = 37.858/1/0.221 | 0.211 |
| Comparative Example 10 | Argon/hydrogen = 60/40 | 659 | 1250 | Toluene/ferrocene = 37.858/1 | — |
| Comparative Example 11 | Argon/hydrogen = 60/40 | 659 | 1250 | Toluene/thiophene = 37.858/0.221 | — |

| | Synthesis conditions of carbon nanotube aggregates | | Yield and properties | | |
|---|---|---|---|---|---|
| | Separately added carbon unit 1.0E-3 mol/min | Introduced amount of catalyst and carbon source solution | G/D ratio (at 532 nm) | DTG peak temperature (° C.) | Yield of carbon nanotube aggregates |
| Comparative Example 1 | None | 150 μL/min | 3 | 505 | 0.3 (g/h) |
| Comparative Example 2 | None | 90 μL/min | 5 | 519 | 0.2 (g/h) |
| Comparative Example 3 | None | 100 μL/min | 32 | 380 | 0.08 (g/h) |
| Comparative Example 4 | Ethylene: 0.446 | 35 μL/min | 81 | 578 | 0.31 (g/h) |
| Comparative Example 5 | Methane: 10.714 | 150 μL/min | 15 | 550 | 2.3 (g/h) |
| Comparative Example 6 | Ethylene: 0.223 Methane: 5.714 | 18 μL/min | 163 | 816 | 0.34 (g/h) |
| Comparative Example 7 | None | 150 μL/min | — | — | 0 (g/h) |
| Comparative Example 8 | None | 150 μL/min | — | — | 0 (g/h) |
| Comparative Example 9 | None | 150 μL/min | <1 | Unmeasurable | <0.001 (g/h) |
| Comparative Example 10 | None | 150 μL/min | — | Unmeasurable | <0.001 (g/h) |
| Comparative Example 11 | None | 150 μL/min | — | — | 0 (g/h) |

INDUSTRIAL APPLICABILITY

The highly pure carbon nanotube aggregates can be synthesized in high efficiency and high yield.

The invention claimed is:

1. A method of producing a carbon nanotube-containing composition to synthesize carbon nanotube aggregates, comprising:
    introducing a ferrocene derivative, a sulfur compound, a carbon source, and a carrier gas into a gas phase flowing through a reaction tube in a heating furnace at a temperature of 1,200° C. to 1,800° C., wherein
    the carbon source substantially consists of benzene or toluene,
    the carrier gas includes hydrogen in an amount of 10% by volume to 85% by volume, and
    a linear velocity of the carrier gas in a reaction region of the reaction tube is 500 cm/min to 2,200 cm/min.

2. The method according to claim 1, wherein the carrier gas includes at least one gas selected from nitrogen, argon, and helium in an amount of higher than 15% by volume to lower than 90% by volume.

3. The method according to claim 1, wherein sulfur atoms contained in the sulfur compound are included in an amount of 0.15 mol to 0.20 mol per 1 mol of iron atoms included in the ferrocene derivative.

4. The method according to claim 1, wherein the ferrocene derivative is ferrocene.

5. The method according to claim 1, wherein the sulfur compound is thiophene.

6. The method according to claim 1, wherein obtained carbon nanotube aggregates include double-walled carbon nanotubes.

* * * * *

UNITED STATES PATENT AND TRADEMARK OFFICE
CERTIFICATE OF CORRECTION

PATENT NO.       : 10,266,411 B2
APPLICATION NO.  : 15/736495
DATED            : April 23, 2019
INVENTOR(S)      : Hirai et al.

Page 1 of 1

It is certified that error appears in the above-identified patent and that said Letters Patent is hereby corrected as shown below:

On the Title Page

At (30), please insert the following Foreign Application Priority data:
--July 16, 2015       (JP).....................2015-142018
January 28, 2016      (JP).....................2016-013932--

Signed and Sealed this
Sixteenth Day of July, 2019

Andrei Iancu
*Director of the United States Patent and Trademark Office*